United States Patent
Wilhelms et al.

(10) Patent No.: US 8,834,066 B2
(45) Date of Patent: Sep. 16, 2014

(54) SEGMENTAL BIO-RETENTION BASIN SYSTEM

(71) Applicants: Paul Wilhelms, St. Louis, MO (US); Matt Snelling, St. Louis, MO (US); Jim Fetterman, St. Louis, MO (US); Robert Race, Eagan, MN (US); David Mudd, Bridgeton, MO (US)

(72) Inventors: Paul Wilhelms, St. Louis, MO (US); Matt Snelling, St. Louis, MO (US); Jim Fetterman, St. Louis, MO (US); Robert Race, Eagan, MN (US); David Mudd, Bridgeton, MO (US)

(73) Assignee: HOK Product Design, LLC, Culver City, CA (US)

( * ) Notice: Subject to any disclaimer, the term of this patent is extended or adjusted under 35 U.S.C. 154(b) by 0 days.

(21) Appl. No.: 13/848,171

(22) Filed: Mar. 21, 2013

(65) Prior Publication Data
US 2013/0206662 A1     Aug. 15, 2013

Related U.S. Application Data

(63) Continuation-in-part of application No. 13/447,733, filed on Apr. 16, 2012, now Pat. No. 8,596,909, which is a continuation of application No. 12/622,832, filed on Nov. 20, 2009, now Pat. No. 8,157,991.

(60) Provisional application No. 61/674,327, filed on Jul. 21, 2012.

(51) Int. Cl.
| | |
|---|---|
| *E03F 1/00* | (2006.01) |
| *B65G 5/00* | (2006.01) |
| *B01D 21/00* | (2006.01) |
| *E04G 21/14* | (2006.01) |
| *C02F 3/32* | (2006.01) |
| *E03F 5/10* | (2006.01) |
| *E03F 5/14* | (2006.01) |
| *C02F 103/00* | (2006.01) |

(52) U.S. Cl.
CPC .............. *E03F 1/00* (2013.01); *B01D 21/0003* (2013.01); *E03F 1/002* (2013.01); *E03F 5/14* (2013.01); *E04G 21/14* (2013.01); *C02F 2203/006* (2013.01); *C02F 3/327* (2013.01); *C02F 2103/001* (2013.01); *E03F 5/103* (2013.01)
USPC .................................. 405/55; 405/36; 405/53

(58) Field of Classification Search
USPC ........................................ 405/36, 53, 55, 286
See application file for complete search history.

(56) References Cited

U.S. PATENT DOCUMENTS

| | | | | |
|---|---|---|---|---|
| 876,985 | A | * | 1/1908 | Malancon ..................... 52/585.1 |
| 3,323,311 | A | * | 6/1967 | Johnson .......................... 405/46 |

(Continued)

OTHER PUBLICATIONS

Hazelrigg, George: "From Legos to Rain Gardens: Designers at the HOK Planning Group Conceive a Modular Rain Garden"; Jun. 2011; Landscape Architecture Magazine.

*Primary Examiner* — Benjamin Fiorello
(74) *Attorney, Agent, or Firm* — Bryan W. Bockhop; Bockhop & Associates, LLC

(57) ABSTRACT

A retention basin includes interlocking concrete vertical wall segments engaged with adjacent segments. Each segment has a vertical wall and a top edge that defines a lifting bore that is complimentary in shape to a removable lifting bolt that is configured to provide a lifting attachment point for a lifting cable and an internal bore in alignment with the internal bore of an adjacent segment. A pin is disposed in the internal bores to maintain the segments in alignment. An eyebolt includes an eye portion disposed around the pin. A plate is bolted to the eyebolt and against the vertical walls of two adjacent segments to maintain the two segments in a spatial relationship. An earth anchor is buried in the soil to provide lateral support to the segments. A post-installation attachment is affixed to the lifting bore of at least one segment.

20 Claims, 11 Drawing Sheets

(56) References Cited

U.S. PATENT DOCUMENTS

| | | | |
|---|---|---|---|
| 5,810,510 A * | 9/1998 | Urriola | 405/45 |
| 5,865,005 A * | 2/1999 | Cataldo | 52/598 |
| 6,675,547 B1 * | 1/2004 | Golcheh | 52/741.13 |
| 8,157,991 B2 * | 4/2012 | Wilhelms et al. | 210/150 |
| 8,596,909 B2 * | 12/2013 | Wilhelms et al. | 405/53 |
| 2003/0223825 A1 * | 12/2003 | Timmons et al. | 405/285 |
| 2010/0021236 A1 * | 1/2010 | Kreikemeier | 405/55 |

* cited by examiner

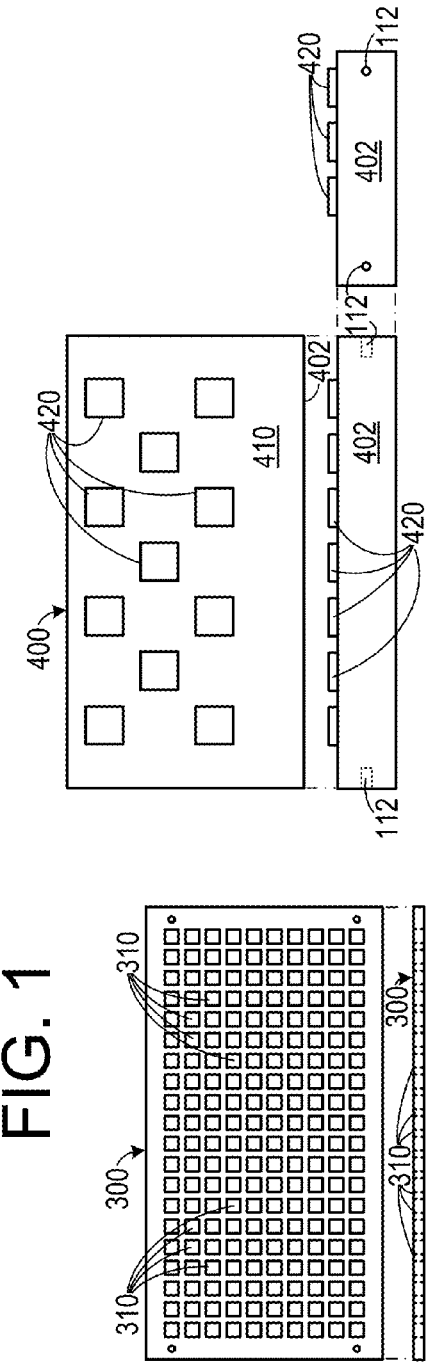
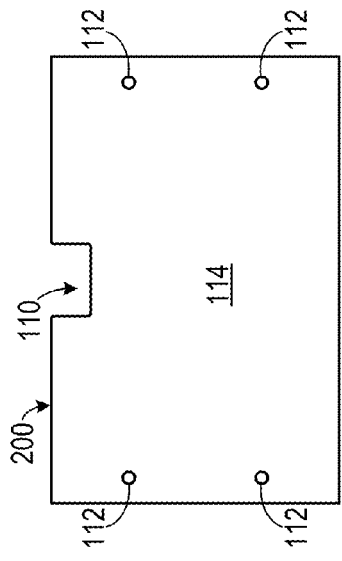
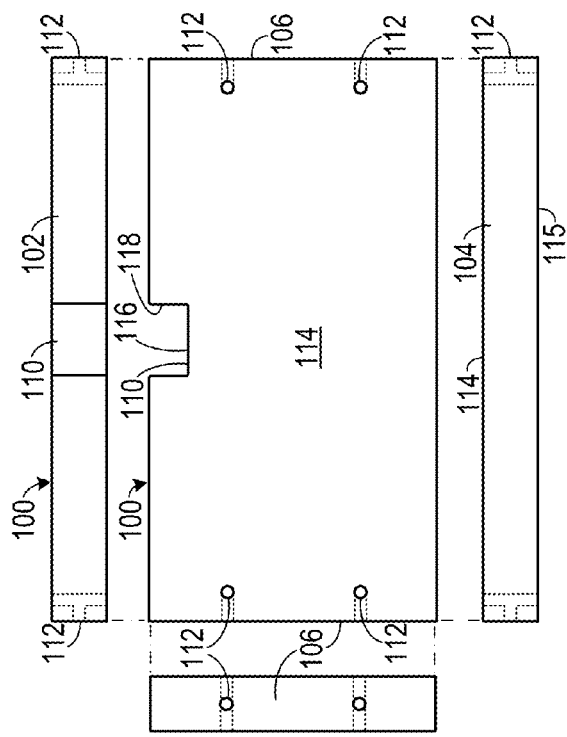

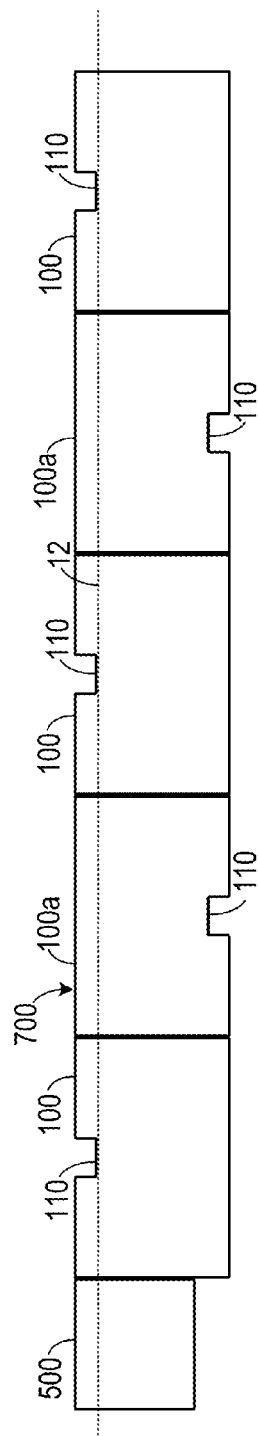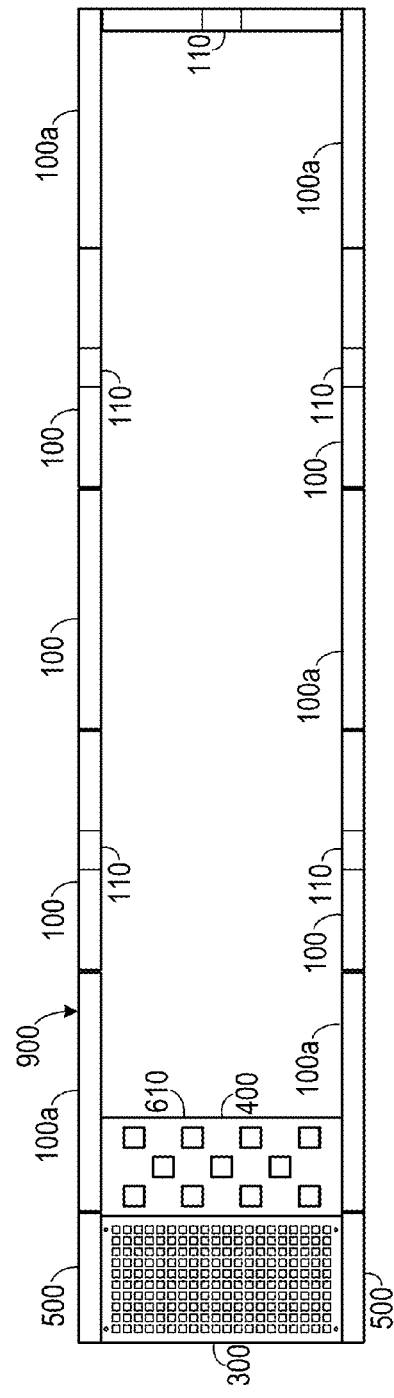

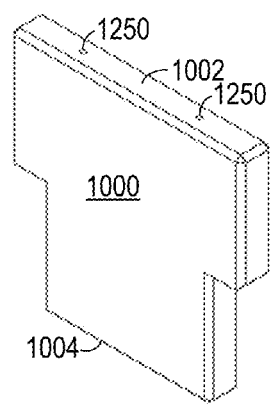 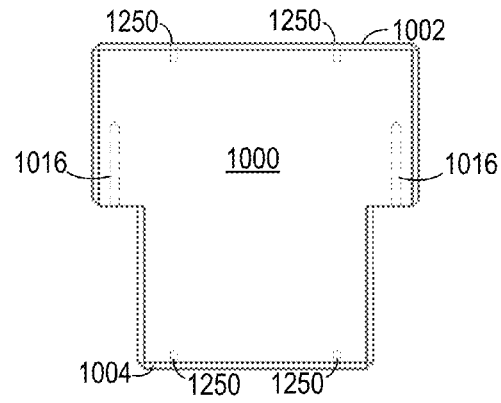
FIG. 11A      FIG. 11B
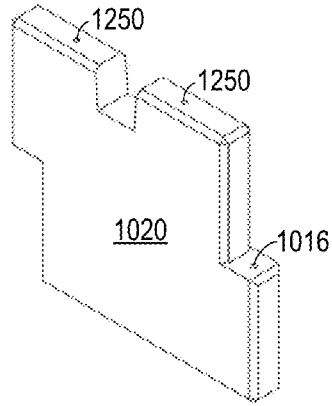 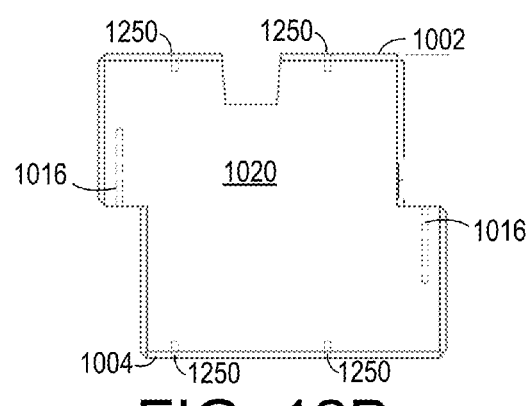
FIG. 12A      FIG. 12B
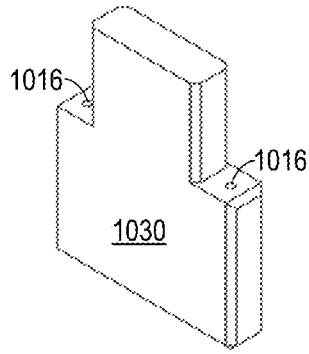 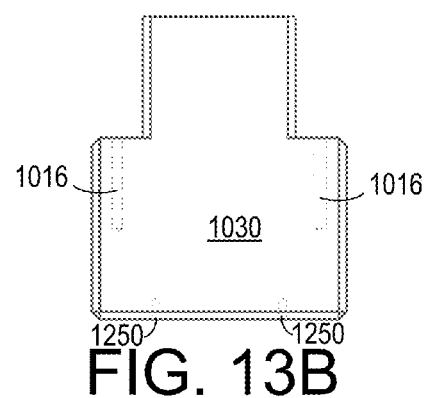
FIG. 13A      FIG. 13B

US 8,834,066 B2

SEGMENTAL BIO-RETENTION BASIN SYSTEM

CROSS-REFERENCE TO RELATED APPLICATION(S)

This application is a continuation-in-part of, and claims the benefit of, U.S. patent application Ser. No. 13/447,733, filed Apr. 16, 2012, which is a continuation of U.S. patent application Ser. No. 12/622,832, filed Nov. 20, 2009, which issued on Apr. 17, 2012 as U.S. Pat. No. 8,157,991 the entirety of each of which is hereby incorporated herein by reference. This application also claims the benefit of U.S. Provisional Patent Application Ser. No. 61/674,327, filed on Apr. 16, 2012, the entirety of which is hereby incorporated herein by reference.

BACKGROUND OF THE INVENTION

1. Field of the Invention

The present invention relates to utility systems and, more specifically, to a prefabricated segmented system for building bio-retention system enclosures.

2. Description of the Prior Art

Storm water runoff places a substantial economic burden on public water treatment facilities. As open land comes under development and is paved over, storm water that would otherwise be absorbed by soil flows into local storm sewer systems. Such water often suspends solids and other pollutants as it flows over paved surfaces. Once in the storm sewer system, the water flows to a water treatment facility where it must be treated to remove the solids and pollutants. Not only is such water treatment expensive, but so is the cost of infrastructure improvements necessary to convey the storm water.

Local bio-retention basins are increasingly used to catch storm water and allow it to settle solids locally before transfer to a storm sewer system. Many such basins also allow storm water to be infiltrated into the surrounding soil, thereby reducing the demands placed on the local storm sewer system.

A bio-retention system can be configured as a rain garden. A rain garden is a garden that diverts storm water for storm water filtration and groundwater recharge. Typically, a rain garden includes an area that retains storm water that would otherwise flow into the storm sewer system. Rain gardens mitigate the effects of runoff in urban areas by allowing storm water to seep into the water table, thereby filtering the water by the surface soil and preventing flow of the storm water into the storm sewer system. Also, some rain gardens use storm water to grow aesthetically pleasing plants, thereby making urban areas more attractive. Use of rain gardens in medians and next to sidewalks that would otherwise be paved over results in less stress on the municipality's drainage systems, improved groundwater quality and a more pleasing urban environment.

Most bio-retention basins include a surrounding curb or retaining wall used to form an enclosure that keeps water local to the basin. Water inlets are included to allow water to flow into the basin and water outlets are provided to allow overflow to exit the basin.

Unfortunately, in an urban environment, construction of bio-retention basins can be difficult to construct and expensive. One method of constructing such a basin includes setting concrete forms in the configuration of the basin, placing concrete in the forms, allowing the concrete to cure, removing the forms and then placing gravel and soil in the basin. This method is costly, labor intensive and may be difficult to perform in a limited urban environment.

Another method includes pre-casting an entire unitary retention system designed to fit into a specific site. The unitary system is then transported to the site on a truck and then installed. Such a unitary system can be bulky and costly to transport. This method may also be difficult to use in limited urban environments and it is inflexible because once installed, it cannot be easily modified.

Therefore, there is a need for a segmental bio-retention enclosure system that is prefabricated, easily transported, inexpensive and that can be arranged in various layouts to accommodate given site conditions.

SUMMARY OF THE INVENTION

The disadvantages of the prior art are overcome by the present invention which, in one aspect, is a bio-retention basin enclosure system that includes a plurality of prefabricated vertical wall segments and a baffle unit. Each of the plurality of wall segments includes a horizontal top end that defines a notch, an opposite horizontal and substantially flat bottom end, a first vertical edge, a second opposite vertical edge, a front vertical surface and an opposite back vertical surface. Each of the first vertical edge and the second vertical edge defines at least one cylindrical bore configured to receive a connecting dowel therein. The baffle unit is configured to be coupled to at least one of the plurality of prefabricated vertical wall segments and to be held in alignment therewith by at least one connecting dowel. The baffle unit includes a water velocity reduction member that is configured to reduce a velocity of water flowing into the baffle unit. At least one connecting dowel has dimensions complimentary to the bore defined by the plurality of prefabricated vertical wall segments and the bore defined by the baffle unit so as to be configured to hold the baffle unit in alignment with at least one of the plurality of prefabricated vertical wall segments.

In another aspect, the invention is a system for constructing bio-retention basin enclosures system that includes a plurality of prefabricated vertical wall segments, at least one prefabricated baffle segment, a planar grate segment, and at least two prefabricated baffle vertical wall members. Each of the plurality of wall segments includes a horizontal top end that defines a notch, an opposite horizontal bottom end, a first vertical edge, a second opposite vertical edge, a front vertical surface and an opposite second vertical surface. Each of the first vertical edge and the second vertical edge defines at least one cylindrical bore configured to receive a connecting dowel therein. The at least one prefabricated baffle segment includes a vertical edge surface, defining a plurality of cylindrical bores, each of which is configured to receive a connecting dowel therein, and a planar member from which a plurality of protrusions extend upwardly therefrom so that the baffle segment is configured to reduce water flow velocity. The planar grate segment defines a plurality of holes passing there through. The at least two prefabricated baffle vertical wall members each have a planar vertical surface that defines a plurality of cylindrical bores disposed so that at least one of the cylindrical bores defined by the vertical edge surface of the prefabricated concrete baffle segment is configured to be placed in alignment therewith. The two baffle vertical wall members are configured to support the prefabricated concrete baffle segment and the planar grate segment so as to form a baffle unit.

In another aspect, the invention is a retention basin enclosure that includes a plurality of prefabricated concrete vertical wall segments, a baffle unit and at least one steel connecting dowel. Each of the plurality of wall segments includes a horizontal top end that defines a notch, an opposite horizontal bottom end, a first vertical edge, a second opposite vertical edge, a front vertical surface and an opposite second vertical surface, each of the first vertical edge and the second vertical edge defining at least one cylindrical bore. The at least one prefabricated concrete baffle segment includes a vertical edge surface that defines a plurality of cylindrical bores and a horizontal planar member from which a plurality of protrusions extend upwardly therefrom so that the baffle segment is configured to reduce water flow velocity. A planar grate segment defines a plurality of holes passing there through. At least two prefabricated concrete baffle vertical wall members each have a planar vertical surface that defines a plurality of cylindrical bores disposed so that at least one of the cylindrical bores defined by the vertical edge surface of the prefabricated concrete baffle segment is configured to be placed in alignment with at least one of the cylindrical bores defined by the planar vertical surface. At least one steel connecting dowel has a first portion of which that is disposed in the bore defined by a selected one of the plurality of prefabricated concrete vertical wall segments and a second portion of which that is disposed in the bore defined by one of the vertical edge surface of the baffle unit so as to couple the at least one of the plurality of prefabricated vertical wall segments to the baffle unit.

In another aspect, the invention is a retention basin for making an enclosure in soil that includes a plurality of interlocking concrete vertical wall segments. Each segment is engaged with an adjacent segment so as to form an enclosed basin. Each segment has a vertical wall and a top edge that defines a lifting bore that is complimentary in shape to a removable lifting bolt that is configured to provide a lifting attachment point for a lifting cable. Each segment includes an internal bore configured to be in linear alignment with the internal bore of the adjacent segment. A metal pin is disposed in the internal bores of two adjacent segments and is configured to maintain the two adjacent segments in alignment. An elongated eyebolt includes an eye portion disposed around the metal pin. A plate is bolted to the elongated eyebolt and driven against the vertical walls of two adjacent segments and is secured to the eyebolt with a nut. The nut is torqued so as to apply a predetermined tension to the eyebolt and a predetermined force to the plate so that the plate and the metal pin maintain the two segments in a substantially fixed spatial relationship. An earth anchor has a first end attached to the eyebolt and a second end, spaced apart from the first end, that includes an anchoring shape that is buried in the soil so as to provide lateral support to the two segments bolted to the plate. A post-installation attachment is affixed to the lifting bore of at least one segment.

In another aspect, the invention is a retention basin segment pair that includes a first concrete wall segment having a first side edge. The first side edge includes a first vertical edge portion having a bottom, a step edge portion extending laterally from the bottom of the first vertical edge portion and having a distal end, and a second vertical edge portion extending downwardly from the distal end of the step edge portion. The step edge portion defines a first internal bore. A second concrete wall segment has a second side edge that is complimentary in shape to the first side edge of the first concrete wall segment. The second side edge includes a first vertical edge portion having a bottom, a step edge portion extending laterally from the bottom of the first vertical edge portion and having a distal end, and a second vertical edge portion extending downwardly from the distal end of the step edge portion. The step edge portion defines a second internal bore. The second concrete wall segment is disposed next to the first concrete wall segment so that the first internal bore is in alignment with the second internal bore. A metal pin is disposed in both the first internal bore and the second internal bore. An elongated bolt is secured to the metal pin. A plate is bolted to the elongated bolt and is driven against both the first concrete segment and the second concrete segment and is secured to the eyebolt with a nut. The nut is torqued so as to apply a predetermined tension to the eyebolt and a predetermined force to the plate so that the plate and the metal pin maintain the first concrete segment in a substantially fixed spatial relationship with the second concrete segment. An earth anchor has a first end attached to the eyebolt and a second end, spaced apart from the first end, that includes an anchoring shape that is configured to be buried in soil so as to provide lateral support to the first concrete segment and to the second concrete segment.

In yet another aspect, the invention is a method of constructing a retention basin, in which a first concrete wall segment is placed into an excavation. The first concrete wall segment has a first side edge, the first side edge including a first vertical edge portion having a bottom, a step edge portion extending laterally from the bottom of the first vertical edge portion and having a distal end, and a second vertical edge portion extending downwardly from the distal end of the step edge portion, the step edge portion defining a first internal bore. A second concrete wall segment is placed into the excavation. The second concrete wall segment has a second side edge that is complimentary in shape to the first side edge of the first concrete wall segment. The second side edge includes a first vertical edge portion having a bottom, a step edge portion extending laterally from the bottom of the first vertical edge portion and having a distal end, and a second vertical edge portion extending downwardly from the distal end of the step edge portion. The step edge portion defines a second internal bore. The second concrete wall segment is disposed next to the first concrete wall segment so that the first internal bore is in alignment with the second internal bore. A metal pin is placed in both the first internal bore and the second internal bore so as to hold the first concrete wall segment in alignment with the second concrete wall segment. An elongated bolt is secured to the metal pin. A plate is passed around a portion of the elongated bolt and the plate is driven against both the first concrete segment and the second concrete segment. The plate is then secured to the eyebolt with a nut. The nut is torqued sufficiently so as to apply a predetermined tension to the eyebolt and a predetermined force to the plate so that the plate and the metal pin maintain the first concrete segment in a substantially fixed spatial relationship with the second concrete segment. An earth anchor is driven into soil to provide lateral support to the first concrete segment and to the second concrete segment. The earth anchor has a first end attached to the eyebolt and a second end, spaced apart from the first end. The second end includes an anchoring shape that is driven into the soil.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIGS. 1-5 are schematic diagrams of different modular components of a retention basin system.

FIG. 8 is an elevational view of one configuration for a retention basin wall using modular components shown in FIGS. 1 and 5.

FIGS. 9A-9C are top plan views of different configurations of retention basins that can be constructed using the modular components shown in FIGS. 1-5.

FIGS. 11A-11B are schematic drawings of a T-shaped segment.

FIGS. 12A-12B are schematic drawings of an S-shaped segment.

FIGS. 13A-13B are schematic drawings of an inverted T-shaped segment.

DETAILED DESCRIPTION OF THE INVENTION

Figure 5:
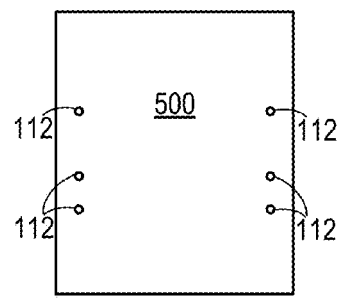

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIGS. 1-5, one embodiment employs a kit of modular segments that are typically constructed from precast concrete. The segments may be put together to form the structure of an enclosure for a retention basin (which, in one representative embodiment can include a rain garden). For example, FIG. 1 shows a main wall segment 100 having a top end 102 a bottom end 104, two side ends 106, a front vertical surface 114 and an opposite back vertical surface 115. Typically, the top end 102 has a rectangular notch 110 formed therein for allowing storm water to drain into or out of the retention basin. The notch 110 includes a substantially flat bottom surface 116 and two vertical surfaces 118. When the bottom surface 116 is placed at ground level, the notch 110 provides a drain for water flowing into or out of the basin.

The ends 106 of the segments 100 include a mechanism to maintain the segments in alignment. For example, bores 112 (which could be cylindrical or, as those of skill in the construction art would readily recognize, of another shape such as prismatic) are be formed therein to receive connecting dowels. When aesthetics require a top surface without a notch 110, the segment may be inverted so that the bottom end 104 is on top and the notch 110 is buried. A shortened segment 200 is shown in FIG. 2. This segment 200 may be used to allow different geometric configurations that would not be possible using only the main segment 100. As will be readily appreciated by those of skill in the construction arts, the specific dimensions of the segments and the materials from which they are constructed can vary depending on the specific application.

A drain grate segment 300 is shown in FIG. 3. This segment 300 is used to allow storm water to drain into the retention basin while allowing people to walk on the grate. The drain grate segment 300 includes a plurality of holes 310 passing therethrough. Typically, this segment 300 is used with a water baffle segment 400 and a vertical wall segment 500 to form a baffle unit. The water baffle segment 400 includes an edge surface 402 that defines several bores 112 and a horizontal surface 410 from which plurality of protrusions 420 extend upwardly therefrom (and possibly indentations). The baffle segment 400 is used to reduce the velocity of incoming water and to disperse the water over a wider area so as to reduce local erosion in the retention basin.

Figure 6A:
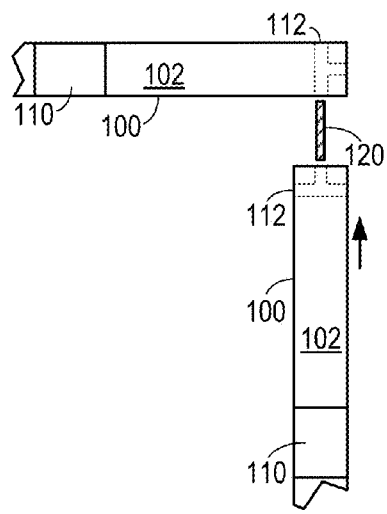
FIGS. 6A-6C are top plan views showing the coupling of a first segment and a second segment.
Figure 6B:
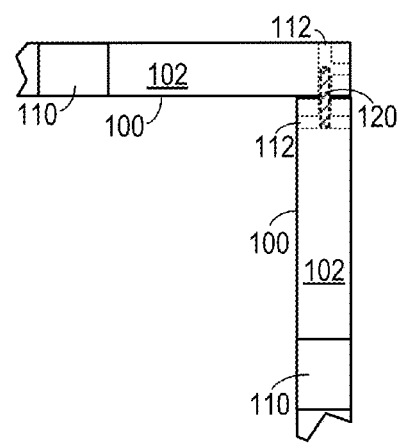
Figure 6C:
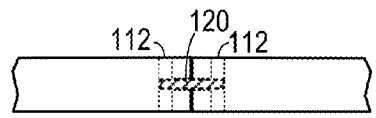

As shown in FIGS. 6A-6C, the segments 100 (and similar segments disclosed above) include bores 112 that allow them to be held in alignment with each other when a dowel 120 (such as a steel rod, a stainless steel rod, or a rod made of another material having a suitable shear strength for the specific application) is placed therein. A corner configuration is shown in FIGS. 6A-6B, wherein FIG. 6A shows the segments 100 prior to coupling and FIG. 6B shows the segments 100 after coupling. An end-to-end configuration is shown in FIG. 6C.

Figure 7A:
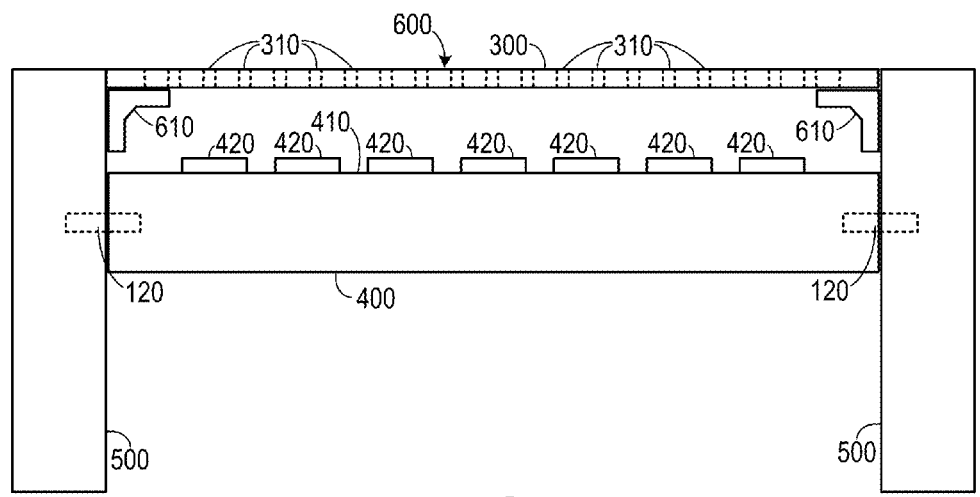
FIGS. 7A and 7B are schematic diagrams of an inflow baffle unit constructed from components shown in FIGS. 3-5.
Figure 7B:
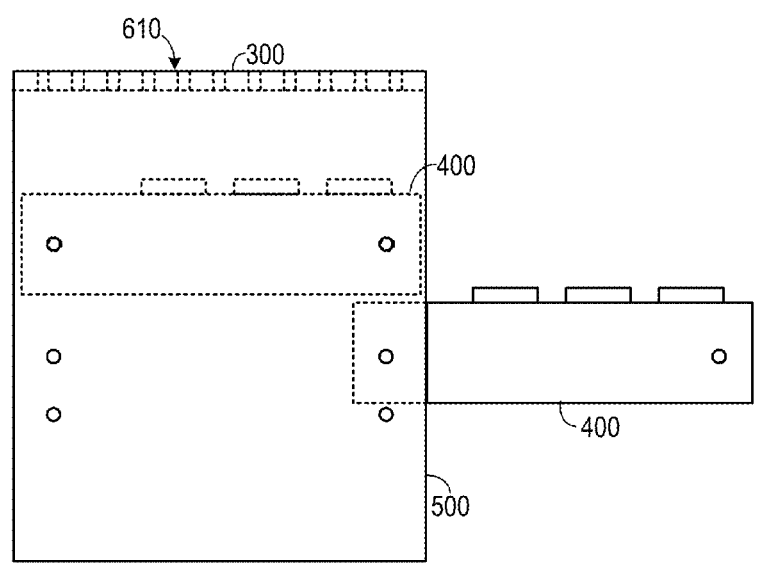

An example of a baffle unit 600 constructed from the segments discussed above is shown in FIG. 7A. Such a structure includes two vertical wall segments 500 that are coupled to a baffle segment 400 with four dowels 120. A drain grate segment 300 coupled to the vertical wall segments 500 with several metal corner brackets 610 (or other types of fasteners as would be readily appreciated by those of skill in the art). As water drains in through the holes 310 defined by the drain grate segment 310, it is dispersed by the protrusions 420 extending from the horizontal surface 410 of the baffle segment 400, there by reducing its velocity and its erosive impact on the contents of the basin. An example of a double-tiered baffle unit 610 is shown in FIG. 7B. This configuration provides an additional level of baffling to incoming storm water.

An example of a retention basin wall 700 is shown in FIG. 8. The segments employed in such a wall 700 are placed relative to ground surface 12 so that the notches 110 are at a level where storm water can flow from the surrounding ground surface 12 into the basin through the notches 110 (or out of the basin through the notches 110 when the basin is full). If it is desired not to have an exposed notch 110 on every segment 100, selected segments 100a can be inverted so that their notches 110 face downwardly.

Figure 9B:
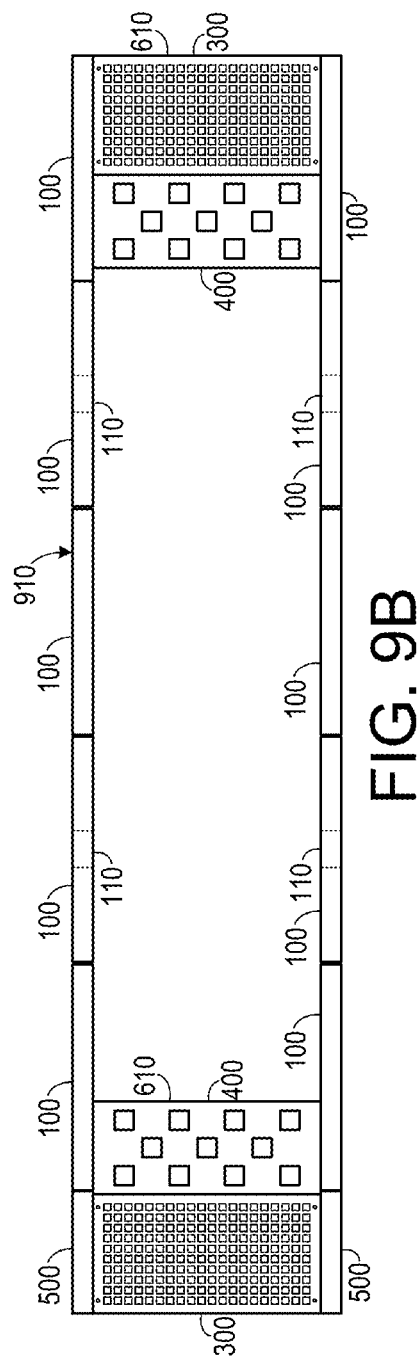
Figure 9C:
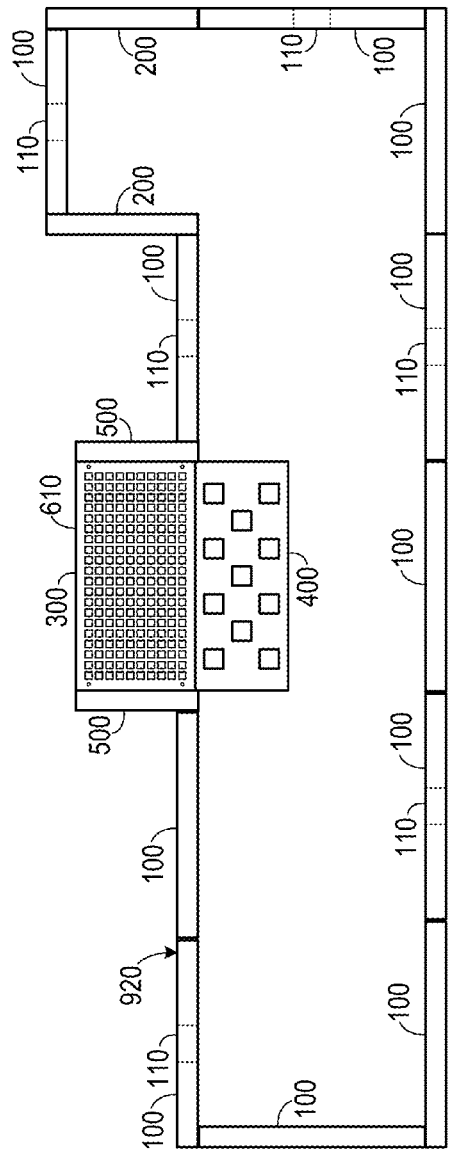
Figure 10:
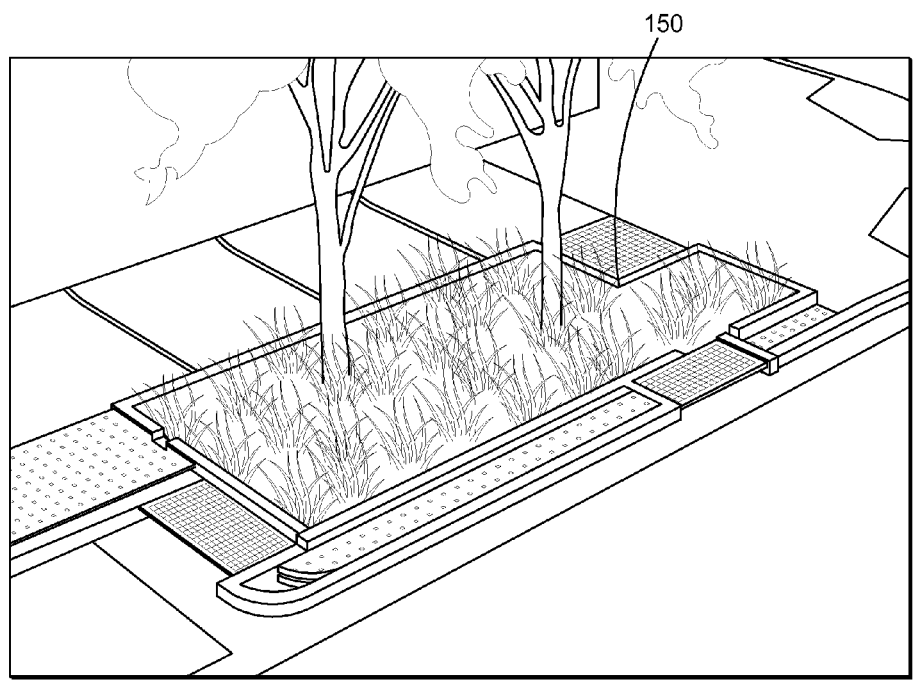
FIG. 10 is a drawing of one embodiment employed in a rain garden.

Several different configurations of the many different configurations of retention basins made possible with the present invention are shown in FIGS. 9A-9C. A substantially linear basin enclosure 900 is shown in FIG. 9A; a substantially linear basin enclosure 910 including two oppositely-disposed baffle units 610 is shown in FIG. 9B; and a cornered basin enclosure 920 is shown in FIG. 9C. A drawing of a rain garden 150 employing a representative embodiment is shown in FIG. 10.

As shown in FIGS. 11A-11B, in one embodiment, a T-shaped segment 1000 is used. The T-shaped segment 1000 includes a top edge 1002 and an opposite bottom edge 1004. (However, as will be seen in FIG. 19A, the segment 1000 can be used in an inverted position.) Both the top edge 1002 and the bottom edge 1004 define a lifting bore 1250. Each segment includes an internal bore 1016 that is used to maintain adjacent segments in linear alignment with each other. FIGS. 12A-12B show an S-shaped segment 1020 and FIGS. 13A-13B show an alternate T-shaped segment 1030.

Figure 14A:
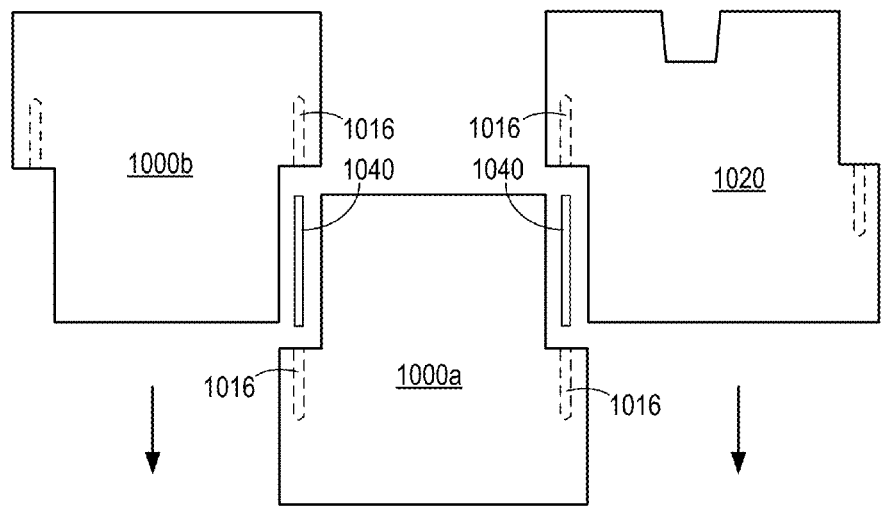
FIGS. 14A-14B are schematic drawings of a wall constructed with T-shaped and S-shaped segments.
Figure 14B:
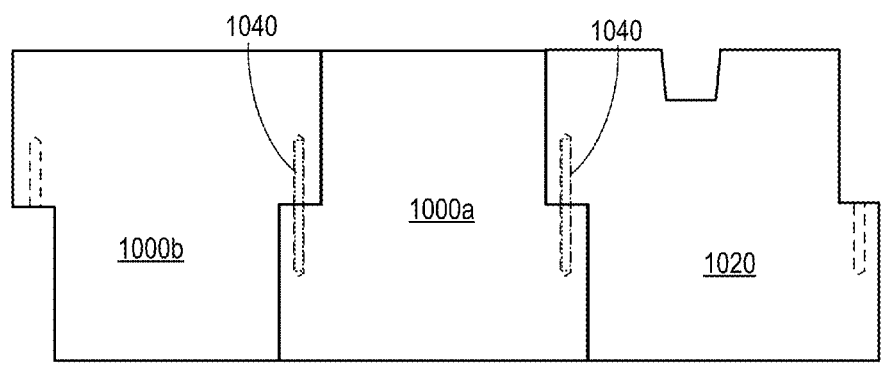
Figure 15A:
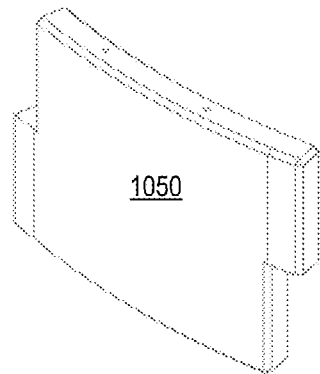
FIGS. 15A-15B are schematic drawings of a curved S-shaped segment.
Figure 15B:
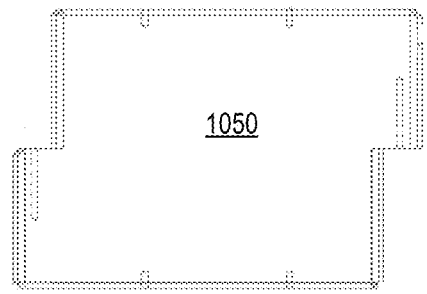
Figure 16A:
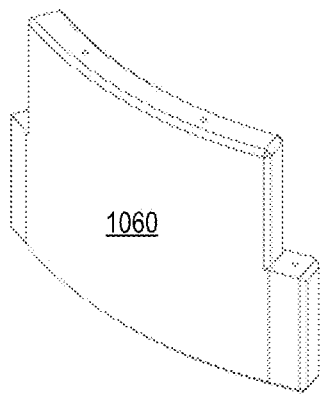
FIGS. 16A-16B are schematic drawings of a curved inverted T-shaped segment.
Figure 16B:
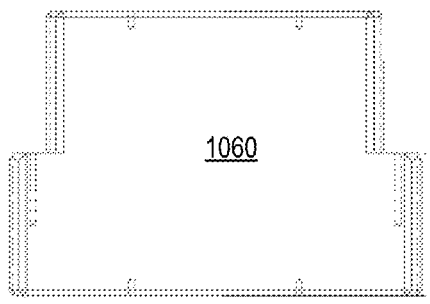

As shown in FIGS. 14A-14B, shows one method of connecting segments to form a wall. In this embodiment, a bottom segment 1000 is placed in a desired location and then pins 1040, such as a steel dowel, are placed in the internal bores 1016 of the bottom segment 1000a. The pins 1040 maintain the alignment of the segments 1000. Top segments 1000b and 1020 are then lowered into place so that the pins 1040 fit in their internal bores 1016.

Figure 17:
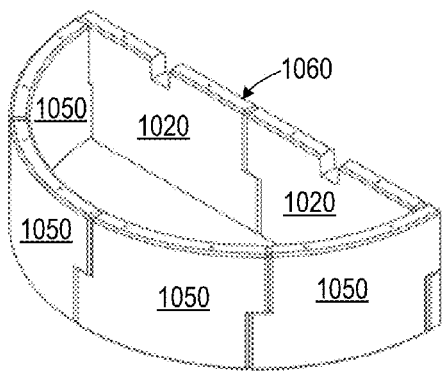
FIG. 17 is a schematic drawing of a semicircular basin.

Curved S-shaped segments 1050 are shown in FIGS. 15A-15B and FIGS. 16A-16B show curved T-shaped segments 1060 (in an inverted position). A basin 1060 that is made from both curved segments 1050 and straight segments 1020 is shown in FIG. 17.

Figure 18A:
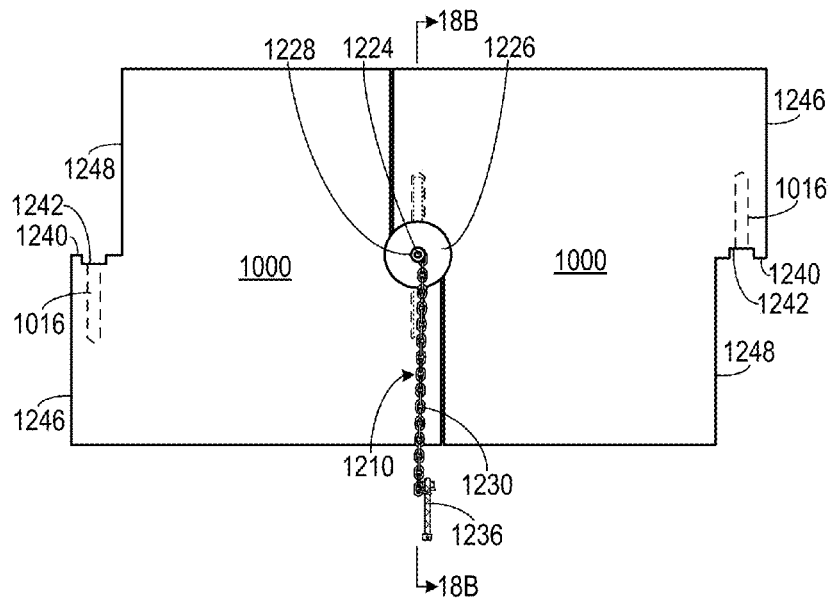
FIG. 18A is a schematic drawing of two basin segments and an anchoring device.
Figure 18B:
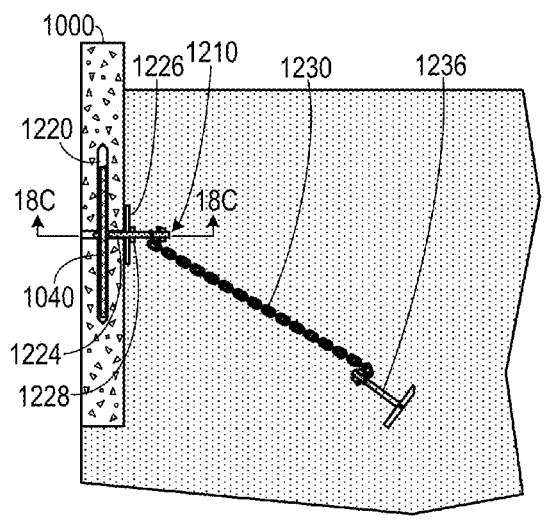
FIG. 18B is a schematic cross sectional drawing of the drawing shown in FIG. 18A, taken along line 18B-18B.
Figure 18C:
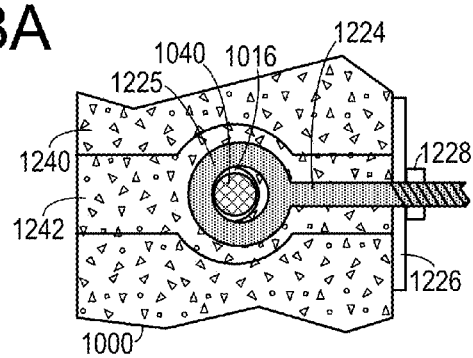
FIG. 18C is a schematic cross sectional drawing of a portion of the drawing shown in FIG. 18Bm taken along line 18C-18C.
Figure 18D:
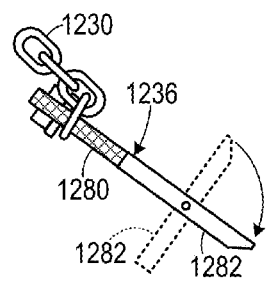
FIG. 18D is a schematic diagram of an anchoring shape.

One method of stabilizing a wall of a bio-retention basin is shown in FIGS. 18A-C. In this method, each segment 1000 includes a side edge that includes a first vertical edge portion 1248 having a bottom from which a step edge portion 1240 extends laterally to a distal end. A second vertical edge portion 1246 extends downwardly from the distal end of the step edge portion 1240. The internal bore 1016 opens to the step edge portion 1240. A lateral groove 1242 may also run across the step edge portion 1240. The segments 1000 are held in alignment with each other and are stabilized in the soil with an anchoring system 1210.

The anchoring system 1210 includes an elongated eyebolt 1224 that includes an eye portion 1225 that is disposed about the about the metal pin 1040 and that fits in the lateral groove 1242. A metal plate 1226 is bolted to the eyebolt 1224 with a nut 1228. Sufficient torque is applied to the nut 1228 so that the eyebolt 1224 applies sufficient tension to the metal pin 1040 and so that the plate 1226 applies sufficient force to the segments 1000 to keep them in a substantially fixed spatial relationship.

An earth anchor 1210 is used to provide lateral support to the segments 1000. The earth anchor 1210 includes a chain 1230 (or a cable) with one end coupled to the eyebolt 1224 (e.g., with a second nut). An anchoring shape 1236 is coupled to the opposite end of the chain 1230. The anchoring shape 1236 is driven into the soil and provides a surface that resists movement within the soil. As shown in FIG. 20, the anchoring shape 1236 can include a rod portion 1280 and a transverse portion 1282 that is hingedly attached to the rod portion 1280. The transverse portion 1282 is initially in lateral alignment with the rod portion 1280 while the anchoring shape 1236 is driven into the soil and then is in a second position that is aligned transversely relative to the rod portion so as to provide resistance to slippage once the anchoring shape is disposed in soil. Typically, the anchoring shape 1236 is pounded into the soil with a steel rod and then the transverse portion 1282 moves into the second position as a result of soil resistance resulting from backwards movement of the anchoring shape 1236. Once the anchoring shape 1236 is securely in place, the chain 1230 can be tightened to maintain strain on both the eyebolt 1224 and the anchoring shape 1236. In one example of an alternative embodiment, an anchoring auger (which is screwed into place rather than pounded) can be used as an anchoring shape.

Figure 19A:
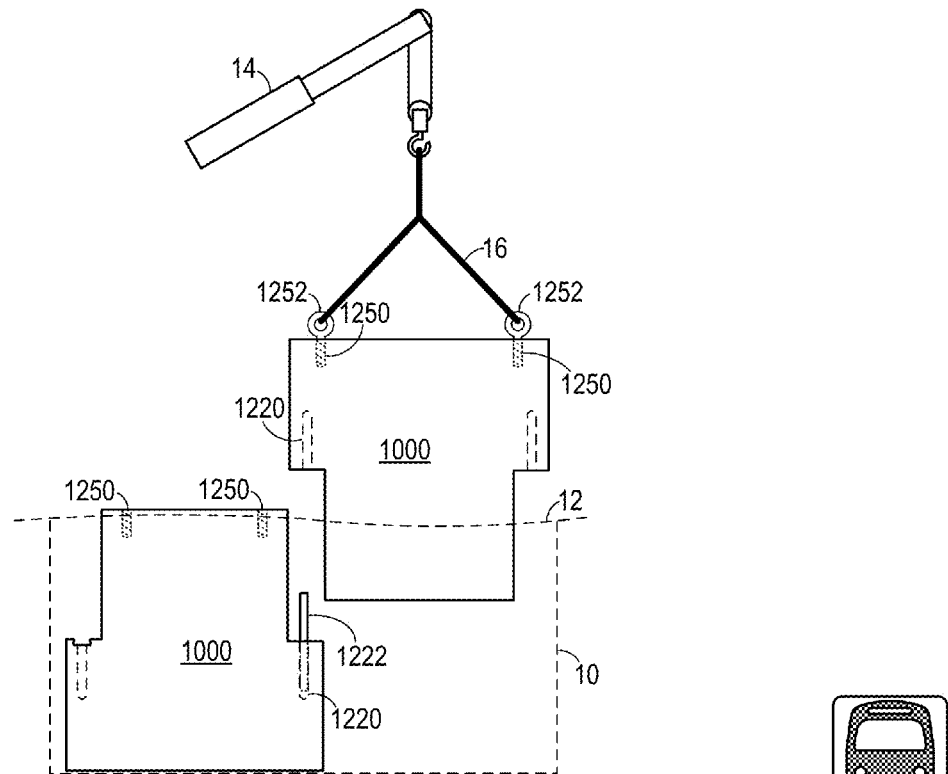
FIG. 19A is a schematic drawing of two basin segments during installation.
Figure 19B:
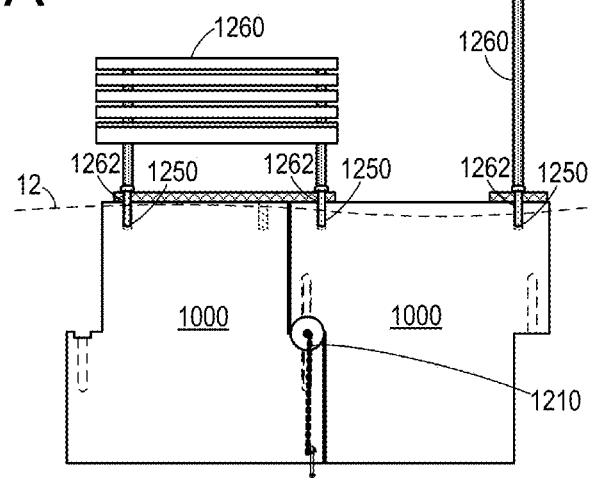
FIG. 19B is a schematic drawing of the two basin segments shown in FIG. 19A after installation.

As shown in FIGS. 19A-19B, segments 1000 can be installed by screwing lifting bolts 1252 into the lifting bores 1250, attaching cables 16 to the lifting bolts 1252 and lifting the segment 1000 from a truck with a crane 14 and lowering it into an excavation 10. Once the segments 1000 are installed, the lifting bolts 1252 are removed and the excavation 10 is backfilled to the ground surface 12. While the lifting bores 1250 can be filled in with a material such as patching cement or silicone, they can be used to anchor post installation attachments 1260, which can be bolted to the segments 1000 with bolts 1262. A few examples of post-installation attachments, commonly found in the urban environment, that can be bolted to the segments 1000 include: a bench; a sign; a waste receptacle; a shelter; an enclosure; a streetlight; a traffic light; a bicycle rack; a newspaper vending box; a bollard; a fence; and many other types of attachments.

The embodiments disclosed herein have the advantages of being easy to transport, inexpensive and they can be arranged in many different layouts to accommodate the available geometry of a specific site. They also have the advantage of being easily modified to allow for changes in design.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A retention basin for making an enclosure in soil, comprising:
   a. a plurality of interlocking concrete vertical wall segments, each segment engaged with an adjacent segment so as to form an enclosed basin, each segment having a vertical wall and a top edge that defines a lifting bore that is complimentary in shape to a removable lifting bolt that is configured to provide a lifting attachment point for a lifting cable, each segment including an internal bore configured to be in linear alignment with the internal bore of the adjacent segment;
   b. a metal pin disposed in the internal bores of two adjacent segments and configured to maintain the two adjacent segments in alignment;
   c. an elongated eyebolt including an eye portion disposed around the metal pin;
   d. a plate bolted to the elongated eyebolt and driven against the vertical walls of two adjacent segments and secured to the eyebolt with a nut, the nut torqued so as to apply a predetermined tension to the eyebolt and a predetermined force to the plate so that the plate and the metal pin maintain the two segments in a substantially fixed spatial relationship;
   e. an earth anchor having a first end attached to the eyebolt and a second end, spaced apart from the first end, that includes an anchoring shape that is buried in the soil so as to provide lateral support to the two segments bolted to the plate; and
   f. a post-installation attachment affixed to the lifting bore of at least one segment.

2. The retention basin claim 1, wherein the post-installation attachment comprises a device selected from a group of devices consisting of: a bench; a sign; a waste receptacle; a shelter; an enclosure; a streetlight; a traffic light; a bicycle rack; a newspaper vending box; a bollard; a fence; and combinations thereof.

3. The retention basin claim 1, wherein the earth anchor includes a selected one of a chain and a cable that defines the first end of the earth anchor and that is affixed to the anchoring shape.

4. The retention basin claim 1, wherein the anchoring shape comprises:
   a. a rod portion; and
   b. a transverse portion hingedly attached to the rod portion, the transverse portion having a first position, in which the transverse portion is in lateral alignment with the rod portion to facilitate the pounding of the anchoring shape into soil, and a second position that is aligned transversely relative to the rod portion so as to provide resistance to slippage once the anchoring shape is disposed in soil.

5. The retention basin claim 1, wherein the anchoring shape comprises an auger.

6. A retention basin segment pair, comprising:
   a. a first concrete wall segment having a first side edge, the first side edge including a first vertical edge portion having a bottom, a step edge portion extending laterally from the bottom of the first vertical edge portion and having a distal end, and a second vertical edge portion extending downwardly from the distal end of the step edge portion, the step edge portion defining a first internal bore;
   b. a second concrete wall segment having a second side edge that is complimentary in shape to the first side edge of the first concrete wall segment, the second side edge including a first vertical edge portion having a bottom, a step edge portion extending laterally from the bottom of the first vertical edge portion and having a distal end, and a second vertical edge portion extending downwardly from the distal end of the step edge portion, the step edge portion defining a second internal bore, the second concrete wall segment disposed next to the first concrete wall segment so that the first internal bore is in alignment with the second internal bore;
   c. a metal pin disposed in both the first internal bore and the second internal bore;
   d. an elongated bolt secured to the metal pin;
   e. a plate bolted to the elongated bolt and driven against both the first concrete segment and the second concrete segment and secured to the eyebolt with a nut, the nut torqued so as to apply a predetermined tension to the eyebolt and a predetermined force to the plate so that the plate and the metal pin maintain the first concrete segment in a substantially fixed spatial relationship with the second concrete segment; and
   f. an earth anchor having a first end attached to the eyebolt and a second end, spaced apart from the first end, that includes an anchoring shape that is configured to be buried in soil so as to provide lateral support to the first concrete segment and to the second concrete segment.

7. The retention basin segment pair of claim 6, wherein the elongated bolt comprises and eyebolt that includes an eye portion disposed around the metal pin.

8. The retention basin segment pair of claim 6, wherein the earth anchor includes a selected one of a chain and a cable that defines the first end of the earth anchor and that is affixed to the anchoring shape.

9. The retention basin segment pair of claim 6, wherein the anchoring shape comprises:
   a. a rod portion; and
   b. a transverse portion hingedly attached to the rod portion, the transverse portion having a first position, in which the transverse portion is in lateral alignment with the rod portion to facilitate the pounding of the anchoring shape into soil, and a second position that is aligned transversely relative to the rod portion so as to provide resistance to slippage once the anchoring shape is disposed in soil.

10. The retention basin segment pair of claim 6, wherein the anchoring shape comprises and auger.

11. The retention basin segment pair of claim 6, wherein the first concrete wall segment and the second concrete wall segment each include a top edge that defines a lifting bore that is complimentary in shape to a removable lifting bolt that is configured to provide a lifting attachment point for a lifting cable.

12. The retention basin segment pair of claim 11, further comprising a post-installation attachment affixed to the lifting bore of at least a selected one of the first concrete wall segment and the second concrete wall segment.

13. The retention basin segment pair of claim 12, wherein the post-installation attachment comprises a device selected from a group of devices consisting of: a bench; a sign; a waste receptacle; a shelter; an enclosure; a streetlight; a traffic light; a bicycle rack; a newspaper vending box; a bollard; a fence; and combinations thereof.

14. A method of constructing a retention basin, comprising the steps of:
   a. placing a first concrete wall segment into an excavation, the first concrete wall segment having a first side edge, the first side edge including a first vertical edge portion having a bottom, a step edge portion extending laterally from the bottom of the first vertical edge portion and having a distal end, and a second vertical edge portion extending downwardly from the distal end of the step edge portion, the step edge portion defining a first internal bore;
   b. placing a second concrete wall segment into the excavation, the second concrete wall segment having a second side edge that is complimentary in shape to the first side edge of the first concrete wall segment, the second side edge including a first vertical edge portion having a bottom, a step edge portion extending laterally from the bottom of the first vertical edge portion and having a distal end, and a second vertical edge portion extending downwardly from the distal end of the step edge portion, the step edge portion defining a second internal bore, the second concrete wall segment disposed next to the first concrete wall segment so that the first internal bore is in alignment with the second internal bore;
   c. placing a metal pin in both the first internal bore and the second internal bore so as to hold the first concrete wall segment in alignment with the second concrete wall segment;
   d. securing an elongated bolt to the metal pin;
   e. passing a plate around a portion of the elongated bolt and driving the plate against both the first concrete segment and the second concrete segment and securing the plate to the eyebolt with a nut;
   f. torqueing the nut so as to apply a predetermined tension to the eyebolt and a predetermined force to the plate so that the plate and the metal pin maintain the first concrete segment in a substantially fixed spatial relationship with the second concrete segment; and g. driving an earth anchor having a first end attached to the eyebolt and a second end, spaced apart from the first end, that includes an anchoring shape into soil so as to provide lateral support to the first concrete segment and to the second concrete segment.

15. The method of claim 14, wherein the elongated bolt comprises and eyebolt that includes an eye portion and further comprising the step of disposing the eye portion around the metal pin.

16. The method of claim 14, wherein the earth anchor includes a selected one of a chain and a cable that defines the first end of the earth anchor and that is affixed to the anchoring shape.

17. The method of claim 14, wherein the anchoring shape comprises:
    a. a rod portion; and
    b. a transverse portion hingedly attached to the rod portion, the transverse portion having a first position, in which the transverse portion is in lateral alignment with the rod portion to facilitate the pounding of the anchoring shape into soil, and a second position that is aligned transversely relative to the rod portion so as to provide resistance to slippage once the anchoring shape is disposed in soil.

18. The method of claim 14, wherein the anchoring shape comprises and auger.

19. The method of claim 14, wherein the first concrete wall segment and the second concrete wall segment each include a top edge that defines a lifting bore that is complimentary in shape to a removable lifting bolt that is configured to provide a lifting attachment point for a lifting cable and further comprising the steps of:
    a. attaching the removable lifting bolt to the lifting bore of at least a selected segment of the first concrete wall segment and the second concrete wall segment;
    b. attaching a cable to the removable lifting bolt;
    c. lifting selected segment into place by raising and lowering the cable;
    d. once the selected segment is in place then removing the lifting bolt from the lifting bore; and
    e. bolting a post-installation attachment to the lifting bore after the lifting bolt has been removed.

20. The method of claim 19, wherein the post-installation attachment comprises a device selected from a group of devices consisting of: a bench; a sign; a waste receptacle; a shelter; an enclosure; a streetlight; a traffic light; a bicycle rack; a newspaper vending box; a bollard; a fence; and combinations thereof.

* * * * *